United States Patent
Sasaki et al.

(10) Patent No.: US 9,631,562 B2
(45) Date of Patent: Apr. 25, 2017

(54) VARIABLE CYLINDER ENGINE

(71) Applicant: Mazda Motor Corporation, Aki-gun, Hiroshima (JP)

(72) Inventors: Junsou Sasaki, Hiroshima (JP); Kazutoyo Watanabe, Higashihiroshima (JP); Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 170 days.

(21) Appl. No.: 14/160,461

(22) Filed: Jan. 21, 2014

(65) Prior Publication Data
US 2014/0222311 A1 Aug. 7, 2014

(30) Foreign Application Priority Data

Feb. 5, 2013 (JP) ................................. 2013-020297

(51) Int. Cl.
*F02D 41/32* (2006.01)
*F02D 17/02* (2006.01)
(Continued)

(52) U.S. Cl.
CPC ............. *F02D 17/02* (2013.01); *F02D 13/08* (2013.01); *F02D 41/0087* (2013.01); *F01P 3/20* (2013.01);
(Continued)

(58) Field of Classification Search
CPC ...... F02D 41/0087; F02D 17/02; F02D 13/06; F02D 13/08; F01L 13/0005; F01L 13/001;
(Continued)

(56) References Cited

U.S. PATENT DOCUMENTS 5,690,073 A * 11/1997 Fuwa .................... F02D 41/062
123/443
5,813,383 A * 9/1998 Cummings ............. F01L 1/146
123/145 A
(Continued)

FOREIGN PATENT DOCUMENTS

DE 19951362 A1 5/2001
JP S5974345 A 4/1984
(Continued)

OTHER PUBLICATIONS

Japan Patent Office, Office Action Issued in Patent Application No. 2013-020297, Feb. 9, 2016, 13 pages. (Submitted with Machine Translation).
(Continued)

*Primary Examiner* — Hai Huynh
*Assistant Examiner* — Gonzalo Laguarda
(74) *Attorney, Agent, or Firm* — Alleman Hall McCoy Russell & Tuttle LLP

(57) ABSTRACT

A variable cylinder engine is provided. The engine includes an engine body having a plurality of cylinders, a cooling mechanism for cooling the engine body by using a coolant, and a controller for controlling a temperature of the coolant and changing the number of active cylinders according to an operating state of the engine. The controller reduces the number of active cylinders in a reduced-cylinder operating range set within a partial engine load range, and expands the reduced-cylinder operating range to a higher engine load side as the coolant temperature becomes lower.

5 Claims, 8 Drawing Sheets

(51) Int. Cl.
    *F02D 13/08*     (2006.01)
    *F02D 41/00*     (2006.01)
    *F01P 3/20*     (2006.01)

(52) U.S. Cl.
    CPC ......... *F02D 2200/021* (2013.01); *Y02T 10/18* (2013.01)

(58) Field of Classification Search
    CPC ... Y02T 10/18; F01P 7/16; F01P 7/167; F01P 2007/146
    USPC ........... 123/41.02, 41.04, 41.05, 41.08, 41.1, 123/198 F
    See application file for complete search history.

(56) References Cited

U.S. PATENT DOCUMENTS

| | | | | |
|---|---|---|---|---|
| 5,826,563 | A * | 10/1998 | Patel | F02D 41/0087 123/198 F |
| 5,975,052 | A * | 11/1999 | Moyer | F01B 17/02 123/198 F |
| 2003/0101961 | A1 * | 6/2003 | Foster | B60H 1/00314 123/198 F |
| 2006/0218899 | A1 | 10/2006 | Narita et al. | |
| 2009/0292439 | A1 * | 11/2009 | Luken | F02D 17/02 701/102 |
| 2010/0251977 | A1 * | 10/2010 | Warchuck | F01P 3/02 123/41.1 |
| 2014/0216368 | A1 * | 8/2014 | Sasaki | F01P 7/16 123/41.08 |
| 2014/0261315 | A1 * | 9/2014 | Willard | F02D 17/02 123/349 |

FOREIGN PATENT DOCUMENTS

| | | |
|---|---|---|
| JP | S5990045 U | 6/1984 |
| JP | 2005188333 A | 7/2004 |
| JP | 2008215231 A | 9/2008 |
| JP | 2009281335 A | 12/2009 |
| JP | 2010270701 A | 12/2010 |
| JP | 2011231621 A | 11/2011 |

OTHER PUBLICATIONS

German Patent and Trademark Office, Office Action Issued in Patent Application No. 102014000635.2, Jun. 20, 2016, 3 pages.

* cited by examiner

VARIABLE CYLINDER ENGINE

BACKGROUND

The present invention relates to a variable cylinder engine which has a plurality of cylinders and performs a reduced-cylinder operation where one or more of the plurality of cylinders are deactivated.

As variable cylinder engines, JP2010-270701A discloses a variable cylinder engine. Specifically, in JP2010-270701A, in a transition to a reduced-cylinder operation, a control of stopping a lift operation of an intake valve to be deactivated is performed. Therefore, the engine in JP2010-270701A includes a mechanism for stopping the operation of the intake valve (valve stopping mechanism). However, since the mechanism is a hydraulic type, due to an increase in viscosity of oil used in the hydraulic control when an engine coolant temperature is low, a period of time required to stop the intake valve of the cylinder to be deactivated (required period of time for the operation of the valve stopping mechanism) becomes long, and the transition to the reduced-cylinder operation may not be performed smoothly.

Therefore, in JP2010-270701A, when the reduced-cylinder operation is requested, the engine coolant temperature is compared with a predetermined lower limit temperature, and when the coolant temperature is confirmed to be lower than the lower limit temperature, a working angle of the intake valve is reduced and a base circle section of a cam (the section spanning from the part causing the intake valve to close to the part causing the intake valve to open) is designed to be long. Thus, even under a condition where the engine coolant temperature is low, the stop operation of the intake valve is completed within the base circle section and the transition to the reduced-cylinder operation is performed smoothly. Therefore, the frequency of the reduced-cylinder operation increases and fuel consumption performance is improved.

On the other hand, in JP2010-270701A, when the engine coolant temperature is higher than the lower limit value, the control of reducing the working angle of the intake valve is not performed and the lift characteristic of the intake valve is set to be normal. However, when the reduced-cylinder operation is performed in this state, if an engine load is relatively increased and the load on the active cylinder is increased, the temperature of the active cylinder is increased and abnormal combustion may occur. In order to avoid such abnormal combustion, an upper limit load for performing the reduced-cylinder operation may be set low; however, the effect of improved fuel consumption will be reduced in this case.

SUMMARY

The present invention is made in view of the above situations and provides a variable cylinder engine, which increases the opportunity to perform a reduced-cylinder operation that results in excellent in fuel consumption performance as much as possible.

According to one aspect of the invention, a variable cylinder engine is provided. The engine includes an engine body having a plurality of cylinders, a cooling mechanism for cooling the engine body by using a coolant, and a controller for controlling a temperature of the coolant and changing the number of active cylinders according to an operating state of the engine. The controller reduces the number of the active cylinders in a reduced-cylinder operating range set within a partial engine load range, and expands the reduced-cylinder operating range to a higher engine load side as the coolant temperature becomes lower.

According to this aspect of the present invention, the reduced-cylinder operating range where the number of active cylinders is reduced is expanded to the higher engine load side as the temperature of the coolant for cooling the engine body becomes lower. Therefore, the reduced-cylinder operation is performed in a larger engine load range as the coolant temperature becomes lower, and thus, the opportunity to perform the reduced-cylinder operation can be increased and fuel consumption performance of the engine can be improved. On the other hand, when the coolant temperature is high, compared to when it is low, since the reduced-cylinder operating range is narrowed in the engine load axis, differently from when the reduced-cylinder operating range is expanded to the higher engine load side regardless of the coolant temperature, it becomes unnecessary to significantly retard an ignition timing as an abnormal combustion countermeasure, and degradation of the fuel consumption due to the retarding can be avoided.

For example, if the reduced-cylinder operating range is expanded to the higher engine load side despite the coolant temperature of the engine being high, the temperature of the active cylinder is increased in a high load part of the expanded reduced-cylinder operating range and abnormal combustion (e.g., knocking) may occur. Although this situation can be avoided by significantly retarding the ignition timing, in this case, the fuel consumption degrades compared to an all-cylinder operation (the engine operation where all the cylinders are active) in the same operating range.

On the other hand, when the reduced-cylinder operating range is only expanded to the higher engine load side under a condition where the coolant temperature of the engine is low (i.e., abnormal combustion does not easily occur), in this case, the above situation can be avoided and it can be possible to only perform the reduced-cylinder operation with excellent fuel consumption performance, and also the opportunity to perform the reduced-cylinder operation can be increased according to the cooled state of the engine.

The reduced-cylinder operating range may be set to a predetermined engine speed range within the partial engine load range. The controller may expand the reduced-cylinder operating range to a higher engine speed side as the coolant temperature becomes lower.

According to this configuration, since the reduced-cylinder operating range is expanded more to a higher engine speed side as the temperature of the coolant for cooling the engine body becomes lower, due to the expansion of the reduced-cylinder operating range to the higher engine load side as described above, the reduced-cylinder operation is performed in a larger engine speed range and a larger engine load range as the coolant temperature becomes lower, and the fuel consumption performance of the engine can be improved. On the other hand, when the coolant temperature is high, since the reduced-cylinder operating range is narrowed at the engine speed axis and the engine load axis compared to when the coolant temperature is low, it becomes unnecessary to significantly retard the ignition timing as an abnormal combustion countermeasure and degradation of the fuel consumption in the reduced-cylinder operation can be avoided.

Specifically, since abnormal combustion (e.g., knocking) does not easily occur when the coolant temperature is low, even if the reduced-cylinder operating range is expanded at the higher engine load and speed sides, the retard amount of the ignition timing can be reduced in the expanded range.

Thus, a sufficient amount of torque can be secured while suppressing the increase in temperature of exhaust gas. Therefore, it becomes unnecessary to sharply enrich an air-fuel ratio, and good fuel consumption in the expanded range can be maintained. On the other hand, when the coolant temperature is high, compared to when it is low, a temperature condition and the like of the exhaust gas becomes severe in either one of the high engine load range and the high engine speed range within the reduced-cylinder operating range. Therefore, if the reduced-cylinder operating range is carelessly expanded at the higher engine load side and the high speed side regardless of the coolant temperature, the fuel consumption is degraded compared to when the all-cylinder operation is performed (here, the operation with a theoretical air-fuel ratio becomes available since the load per cylinder is reduced). Considering this point, with the above configuration, the reduced-cylinder operating range is expanded at the higher engine load and speed sides as the coolant temperature becomes lower (on the other hand, the reduced-cylinder operating range is contracted as the coolant temperature becomes higher).

The controller may narrow the reduced-cylinder operating range instead of expanding, when occurrence of abnormal combustion is confirmed while the engine is operated in the reduced-cylinder operating range.

In such a case where the reduced-cylinder operating range is narrowed according to the actual occurrence of abnormal combustion, the situation where abnormal combustion occurs afterward can surely be avoided without unnecessarily expanding the reduced-cylinder operating range.

When the engine is operated in a first reduced-cylinder range set within a high load part of the reduced-cylinder operating range, the controller may lower the coolant temperature below that in a second reduced-cylinder range set within a low load part of the reduced-cylinder operating range.

According to this configuration, in the operation within the first reduced-cylinder range where abnormal combustion (e.g., knocking) particularly easily occurs within the reduced-cylinder operating range, the coolant temperature is forcibly lowered and an environment in which abnormal combustion does not easily occur can be created. Thus, the opportunity to perform the reduced-cylinder operation can be increased and the fuel consumption performance of the engine can be improved more effectively.

When the engine is operated in a range on either one of a higher engine load side and a higher engine speed side of the reduced-cylinder operating range, the controller may activate all of the cylinders and, similar to the first reduced-cylinder range, lower the coolant temperature.

When the coolant temperature is lowered in the all-cylinder operating range set on either one of the higher engine speed side and the higher engine load side of the reduced-cylinder operating range as above, the occurrence of abnormal combustion can surely be prevented in a part of the all-cylinder operating range where the engine load is particularly high therein or a part of the all-cylinder operating range where the engine speed is particularly high therein (i.e., the part where knocking easily occurs).

Here, although it can also be considered to improve the cooling performance only in a part of the all-cylinder operating range where abnormal combustion easily occurs, in this case, for example, when the operating position of the engine is shifted off the first reduced-cylinder range to the higher engine load side or the higher engine speed side, it becomes necessary to often change the coolant temperature (e.g., change the coolant temperature to low, to high, and then to low again) This not only complicates the control, but a problem also occurs in with respect to responsiveness. Whereas, with the above configuration, the coolant temperature is lowered throughout the all-cylinder operating range on either one of the higher engine load side and the higher engine speed side. Thus, the occurrence of abnormal combustion can surely be prevented while avoiding the disadvantage described above.

DETAILED DESCRIPTION OF EMBODIMENTS (1) Overall Configuration of Engine

Figure 1:
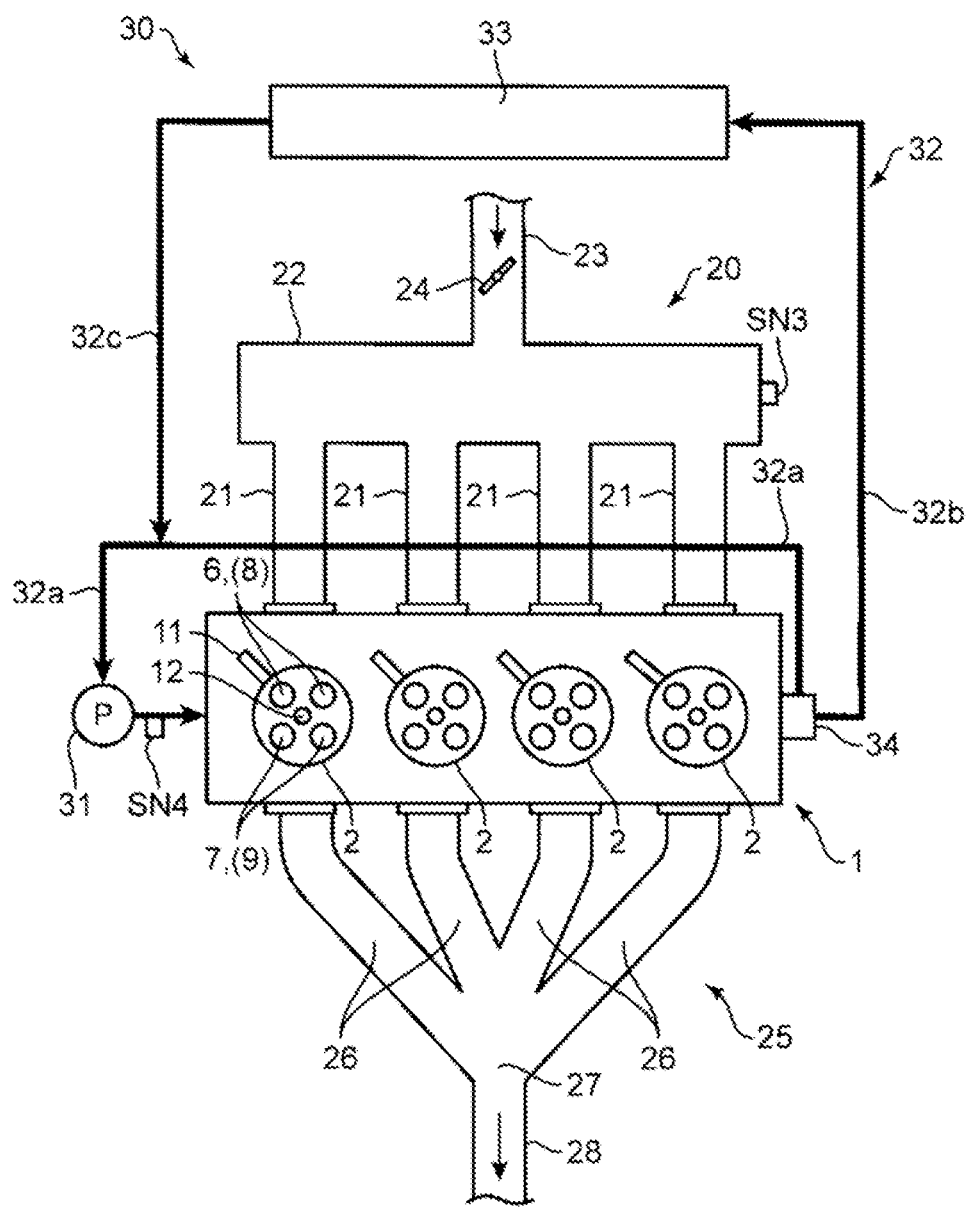
FIG. 1 is a plan view of an overall configuration of a variable cylinder engine according to one embodiment of the present invention.
Figure 2:
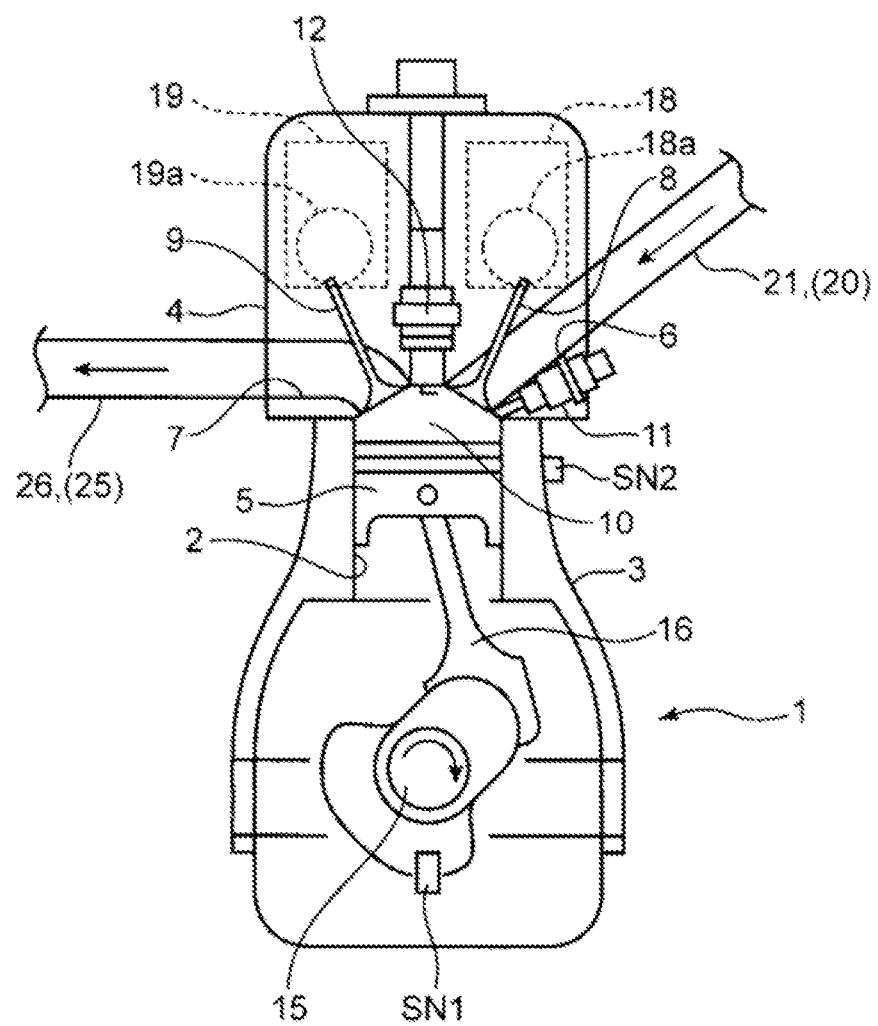
FIG. 2 is a cross-sectional view of a main part of the engine.

FIGS. 1 and 2 illustrate the configuration of a variable cylinder engine according to one embodiment of the present invention. The engine illustrated in FIGS. 1 and 2 is a multi-cylinder gasoline engine having four cycles, installed in a vehicle as a power source for traveling. Specifically, the engine includes an inline four-cylinder engine body 1, an intake passage 20 for introducing air into the engine body 1, an exhaust passage 25 for discharging exhaust gas generated in the engine body 1, and a cooling mechanism 30 for cooling the engine body 1. The engine body 1 has four cylinders 2 arranged in a line.

The engine body 1 includes a cylinder block 3 formed therein with the four cylinders 2, a cylinder head 4 provided on the cylinder block 3, and pistons 5 each reciprocatably fitted into the cylinder 2.

A combustion chamber 10 is formed above each piston 5, and fuel mainly containing gasoline is supplied to the combustion chamber 10 by being injected from an injector 11 (described later). Then, the injected fuel combusts in the combustion chamber 10, and the piston 5 pushed down by an expansion force produced by the combustion reciprocates in an up-and-down direction.

The piston 5 is coupled to a crankshaft 15 via a connecting rod 16. The crankshaft 15 is an output shaft of the engine body 1. The crankshaft 15 rotates around its central axis corresponding to the reciprocation of the piston 5.

The cylinder block 3 is provided with an engine speed sensor SN1 for detecting a rotational speed of the crankshaft 15 as an engine speed, and a vibration sensor SN2 for detecting a vibration strength (acceleration) of the cylinder block 3.

In the cylinder head 4, a pair of injectors 11 for injecting the fuel (gasoline) into the combustion chamber 10 and a pair of ignition plugs 12 are provided for each cylinder 2.

The pair of ignition plugs 12 supply ignition energy produced by a spark-discharge to a gas mixture containing the fuel injected from the injectors 11 and air.

With such a four-cycle four-cylinder gasoline engine of this embodiment, each piston 5 provided to each cylinder 2 moves in the up-and-down direction with a phase difference by 180° in crank angle (180° CA) with the adjacent piston(s). Correspondingly, the ignition timing in the cylinder 2 is also set to a timing shifted by 180° CA from the adjacent cylinder(s). Specifically, when the cylinders 2 are referred to as the first, second, third and fourth cylinders from the left in FIG. 1, the ignition is performed in the order of the first cylinder, the third cylinder, the fourth cylinder, and then the second cylinder.

Note that, although it is described later in detail, the engine of this embodiment is the variable cylinder engine for performing the operation of deactivating two of the four cylinders 2 while activating the other two of the cylinders 2, referred to as a reduced-cylinder operation. Thus, the ignition order described above applies to a normal operation which is not the reduced-cylinder operation (an all-cylinder operation where all of the four cylinders 2 are active). On the other hand, in the reduced-cylinder operation, the ignition operations of the ignition plugs 12 are controlled so that the ignitions are only performed in two of the cylinders of which ignition order is not adjacent; thus, the ignition is performed in every other cylinder with respect to ignition order.

The geometric compression ratio of each cylinder 2, in other words, a ratio between a volume of the combustion chamber 10 when the piston 5 is at a bottom dead center and a volume of the combustion chamber 10 when the piston 5 is at a top dead center is set slightly high for a gasoline engine, which is 12:1 or higher.

The cylinder head 4 includes: intake ports 6 for introducing, into the combustion chambers 10 of the respective cylinders 2, air supplied from the intake passage 20; exhaust ports 7 for discharging, to the exhaust passage 25, exhaust gas generated in the combustion chambers 10 of the respective cylinders 2; intake valves 8 for opening and closing openings of the respective intake ports 6 on the combustion chamber 10 side; and exhaust valves 9 for opening and closing openings of the respective exhaust ports 7 on the combustion chamber 10 side. Note that in this embodiment, two intake valves 8 and two exhaust valves 9 are provided for each cylinder 2.

The intake valves 8 are opened and closed in cooperation with the rotation of the crankshaft 15, by a valve operating mechanism 18 including a pair of camshafts disposed in the cylinder head 4 (FIG. 2). The exhaust valves 9 are opened and closed in cooperation with the rotation of the crankshaft 15, by a valve operating mechanism 19 including a pair of camshafts disposed in the cylinder head 4 (FIG. 2).

The valve operating mechanism 18 for the intake valves 8 is incorporated with valve stopping mechanism parts 18a for stopping lift operations of the intake valves 8 for each cylinder 2 individually. Although any kind of valve stopping mechanism part 18a can be used as long as it can stop the lift operations of the intake valves 8, for example, a component including an input arm for swinging in cooperation with the cam in rotation, a transmission arm for transmitting the movement of the input arm to the intake valves 8, and a coupling pin coupling the input arm to the transmission arm may be used as the valve stopping mechanism part 18a. The coupling pin is driven back and forth in its axial direction by, for example, a hydraulic pressure and can move between a projecting position where the input arm and the transmission arm are coupled to each other, and a retracted position where the coupling therebetween is undone. When the coupling pin is at the projecting position, since the input arm and the transmission arm are coupled to each other via the coupling pin, the movement of the input arm is transmitted to the transmission arm, and the lift operations of the intake valves 8 are performed. On the other hand, when the coupling pin is moved to the retracted position and the input arm and the transmission arm are uncoupled, the movement of the input arm is not transmitted to the transmission arm, and therefore, the lift operations of the intake valves 8 is stopped. In this embodiment, one valve stopping mechanism part 18a having such a structure is provided for each cylinder 2. Thus, the lift operations of the intake valves 8 of each cylinder 2 can be stopped individually.

Similarly, the valve operating mechanism 19 for the exhaust valves 9 is incorporated with valve stopping mechanism parts 19a for stopping lift operations of the exhaust valves 9 for each cylinder 2 individually. As the detailed structure of the valve stopping mechanism parts 19a is substantially the same as that of the valve stopping mechanism parts 18a of the intake valves 8, the description thereof is omitted.

The intake passage 20 is formed with four independent intake passages 21 communicating with the intake ports 6 of the respective cylinders 2, a surge tank 22 commonly connected with upstream end sections (end sections on an upstream side in a flow direction of intake air) of the independent intake passages 21, and a single intake pipe 23 extending upstream from the surge tank 22.

A throttle valve 24 for opening and closing to control a flow rate of intake air to be sucked into the engine body 1, is provided at an intermediate section of the intake pipe 23, and an airflow sensor SN3 for detecting the flow rate of the intake air is provided at the surge tank 22.

The exhaust passage 25 is formed with four independent exhaust passages 26 communicating with the exhaust ports 7 of the respective cylinders 2, a manifold section 27 where downstream end sections (end sections on a downstream side in a flow direction of exhaust air) of the independent exhaust passages 26 join together, and a single exhaust pipe 28 extending downstream from the manifold section 27.

The cooling mechanism 30 includes a coolant pump 31 for pressuring coolant for cooling the engine, a coolant path 32 for circulating the coolant pressured by the coolant pump 31, a radiator 33 for cooling the coolant, a switch valve 34 for switching the flow of the coolant inside the coolant path 32, and a coolant temperature sensor SN4 for detecting a temperature of the coolant.

The coolant path 32 is formed with: a first coolant path 32a for returning the coolant discharged from the engine body 1, to the engine body 1 again without passing through the radiator 33; a second coolant path 32b for introducing the coolant discharged from the engine body 1, into the radiator 33; and a third coolant path 32c for introducing the coolant discharged from the radiator 33, into a downstream section of the first coolant path 32a. The coolant introduced into the engine body 1 through the downstream section of the first coolant path 32a passes through a water jacket (not illustrated) formed inside the cylinder block 3 and the cylinder head 4 of the engine body 1, and then is discharged from the engine body 1 to be led out to either one of an upstream section of the first coolant path 32a and the second coolant path 32b through the switch valve 34.

The coolant pump 31 is, for example, comprised of a mechanical pump for pressuring the coolant by obtaining its drive force from the crankshaft 15 of the engine body 1, and is provided at a position in the vicinity of the engine body 1 on the downstream side with respect to a merging section of the third coolant path 32c and the first coolant path 32a.

The radiator 33 cools the coolant by a heat exchange with outdoor air and is disposed at a predetermined position inside an engine room which receives travel air of the vehicle. For example, in a case where the vehicle is a front-engine vehicle, the radiator 33 is disposed rearward of a front grille provided on a front face of the engine room, and the coolant inside the radiator 33 is cooled by outdoor air being introduced from an air port formed in the front grille and being blown to the radiator 33.

The switch valve 34 is, for example, comprised of an electric-detection type thermostat using a thermistor, and is provided in a branching section into the first coolant path 32a and the second coolant path 32b. The switch valve 34 can switch between a closed state where the flow of the coolant toward the second coolant path 32b is interrupted and an open state where the flow of the coolant toward the second coolant path 32b is allowed.

Specifically, when the temperature of the coolant detected by the coolant temperature sensor SN3 is lower than a predetermined reference temperature, the switch valve 34 is closed. Here, since the coolant only circulates within the first coolant path 32a, the temperature of the coolant gradually increases by the heat generated in the engine body 1. On the other hand, when the temperature of the coolant is higher than the reference temperature, the switch valve 34 is open, and the coolant also flows into the second coolant path 32b. In other words, the coolant led out from the engine body 1, not only circulates within the first coolant path 32a, but is also supplied to the radiator 33 through the second coolant path 32b to be cooled. The coolant, after being cooled in the radiator 33, is again returned back to the engine body 1 through the third coolant path 32c, etc. The degree to which the switch valve 34 here is opened may be varied continuously. By adjusting the degree in this manner, the flow rate of the coolant flowing into the radiator 33 may be arbitrarily adjusted. As the flow rate of the coolant into the radiator 33 is increased by opening the switch valve 34 further, the cooling performance correspondingly increases and the coolant temperature rapidly decreases.

(2) Control System

Figure 3:
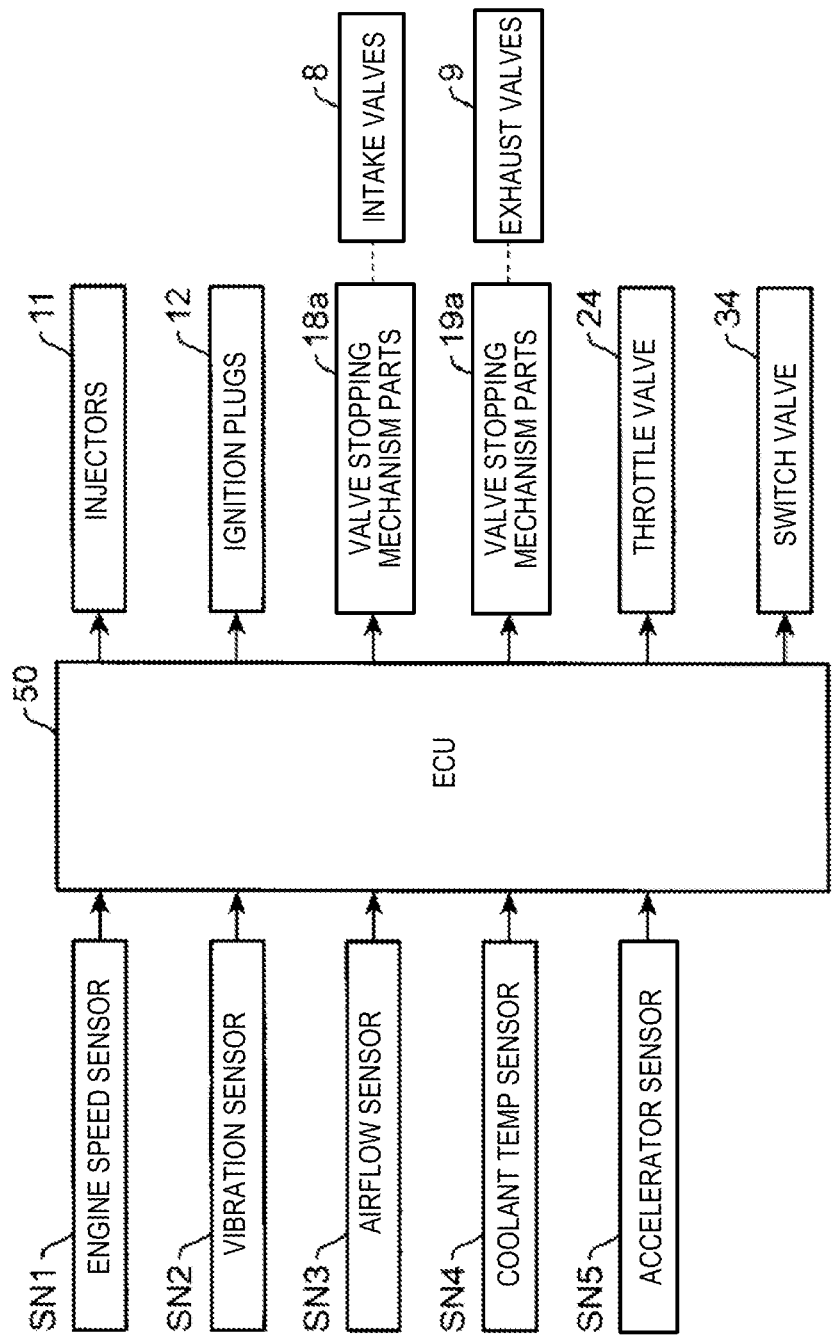
FIG. 3 is a block diagram illustrating a control system of the engine.

Next, a control system of the engine is described using FIG. 3. The respective components of the engine of this embodiment are overall controlled by an ECU (Engine Control Unit) 50. The ECU 50 is, as is well known, comprised of a microprocessor including a CPU (Central Processing Unit), a ROM (Read-Only Memory), and a RAM (Random Access Memory), and the ECU 50 may also be referred to herein as a controller.

The ECU 50 is sequentially inputted with information from the various sensors. Specifically, the ECU 50 is electrically connected to the engine speed sensor SN1, the vibration sensor SN2, the airflow sensor SN3, and the coolant temperature sensor SN4 provided at the respective components of the engine. Moreover, the vehicle of this embodiment is provided with an accelerator sensor SN5 for detecting a degree of actuation of an acceleration pedal (accelerator actuation degree, not illustrated) controlled by the driver. The ECU 50 is also electrically connected with the accelerator opening sensor SN5. The ECU 50 acquires various information including the engine speed, the vibration strength, the intake air amount, the coolant temperature, and the accelerator actuation degree, based on input signals from the sensors SN1 to SN5.

The ECU 50 performs various operations based on the input signals from the respective sensors (SN1 to SN5) while controlling the respective components of the engine. In other words, the ECU 50 is electrically connected with the injectors 11, the ignition plugs 12, the valve stopping mechanism parts 18a and 19a, the throttle valve 24, and the switch valve 34. The ECU 50 outputs respective control signals to these components to drive the components based on the results of the operations, etc.

(3) Control According to Operating State

Next, specific contents of the engine control according to an operating state of the engine are described with reference to FIGS. 4 to 6.

Figure 4:
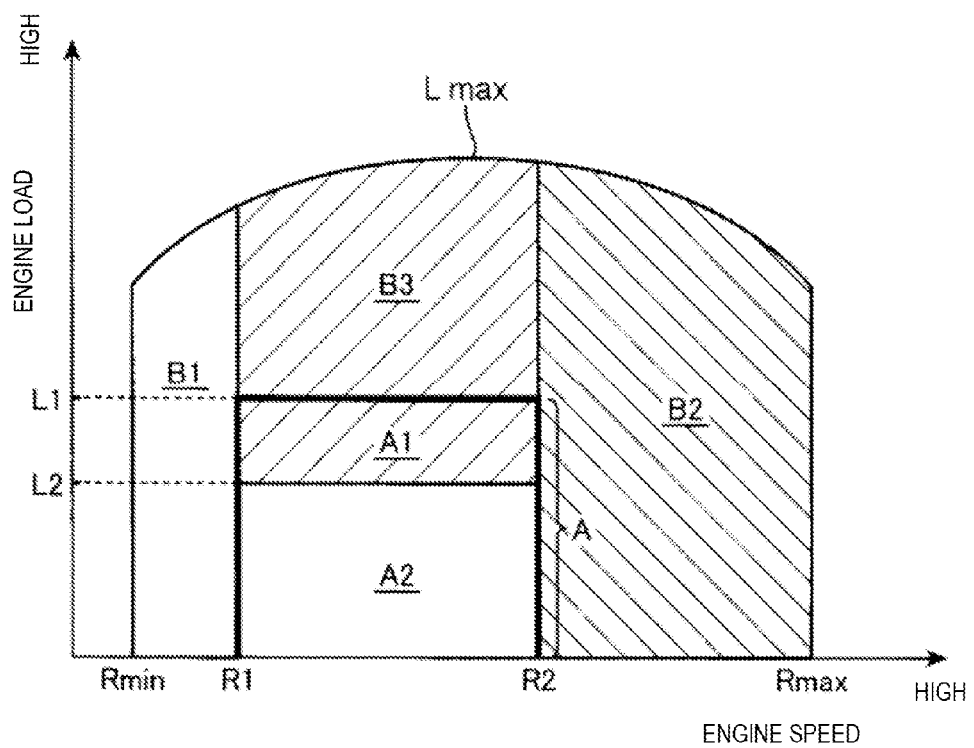
FIG. 4 is a map illustrating operating ranges of the engine which are divided according to a difference in control.

FIG. 4 is a map illustrating operating ranges of the engine which are divided into a plurality of ranges according to a difference in control, in which the engine load and the engine speed are indicated in the vertical axis and the horizontal axis, respectively. In this map, the operating range is roughly divided into a reduced-cylinder operating range A where the reduced-cylinder operation for deactivating two of the four cylinders 2 of the engine is performed, and ranges B1, B2, and B3 where other operation (in which the reduced-cylinder operation is not performed) is performed.

The reduced-cylinder operating range A is set in a range in an intermediate speed range where the engine speed is higher than a first predetermined reference speed R1 but lower than a second predetermined reference speed R2 and a partial load range where the engine load is lower than a predetermined reference load L1.

Further, the reduced-cylinder operating range A is divided, at a load L2 lower than the reference load L1, into a first reduced-cylinder range A1 where the engine load is higher than the load L2 and a second reduced-cylinder range A2 where the engine load is lower than the load L2.

Moreover, the ranges other than the reduced-cylinder operating range A (i.e., all-cylinder operating ranges where all the cylinders are active) are divided into the low-speed all-cylinder range B1 set in an engine speed range where the engine speed is lower than the first reference speed R1, the high-speed all-cylinder range B2 set in an engine speed range where the engine speed is higher than the second reference speed R2, and the high-load all-cylinder range B3 set in a range located between the ranges B1 and B2 and where the engine load is higher than the reference load L1.

The reduced-cylinder operation is not performed in any of the low-speed all-cylinder range B1, the high-speed all-cylinder range B2, and the high-load all-cylinder range B3 for the following reason.

In the low-speed all-cylinder range B1 where the engine speed is low, in a case where the reduced-cylinder operation has reduced the number of the active cylinders to two, the combustion interval between the active cylinders becomes excessively long and engine vibration increases. For this reason, it is required to set the first reference speed R1 which is a lower limit speed in the reduced-cylinder operating range A, larger than an idling speed Rmin of the engine. As a result, the low-speed all-cylinder range B1 where the all-cylinder operation is performed is set in an engine speed range between the speed Rmin and the speed R1. Note that the first reference speed R1 can be set to about $\frac{1}{6}$ of a rated speed Rmax of the engine.

On the other hand, in the reduced-cylinder operating range A, unlike a case where the all-cylinder operation is performed in the same range, it is required to inject substantially twice the amount of fuel into the active cylinders compared to the all-cylinder operation, which increases the load on each active cylinder. Thus, if the reduced-cylinder operating range A is expanded carelessly, a possibility of knocking (i.e., abnormal combustion caused by self-ignition of uncombusted end gas during the flame propagation) occurring increases particularly at a high engine load and a high engine speed in the reduced-cylinder operating range A. This is because the temperatures of the active cylinders increase due to an increase in an amount of fuel injected as the engine load increases and also an increase in heat generated per unit time as the engine speed increases. For this reason, it is required to set the second reference speed R2 which is an upper limit speed in the reduced-cylinder operating range A and the reference load L1 which is an upper limit load in the reduced-cylinder operating range A lower than the rated speed Rmax and a maximum load Lmax of the engine, respectively. As a result, the high-speed all-cylinder range B2 and the high-load all-cylinder range B3 are set between the rated speed Rmax and the second reference speed R2 and between the maximum load Lmax and the reference load L1, respectively.

Note that although the details are described later, second reference speed R2 and the reference load L1 are set variably based on the temperature of the coolant of the engine (the detection value obtained by the coolant temperature sensor SN4). Therefore, although the values of R2 and L1 cannot be concretely defined, as a substantial tendency, the second reference speed R2 may be set to about ⅔ of the rated speed Rmax and the reference load L1 may be set to about ½ of the maximum load Lmax.

Next, the control operation performed by the ECU 50 during the engine operation is described in detail with reference to the flowcharts in FIGS. 5 and 6. Note that the processing illustrated in the flowcharts is performed under a condition that the engine is in a warmed-up state and, thus, the coolant temperature has increased to a predetermined value (e.g., 80° C.) or higher.

Figure 5:
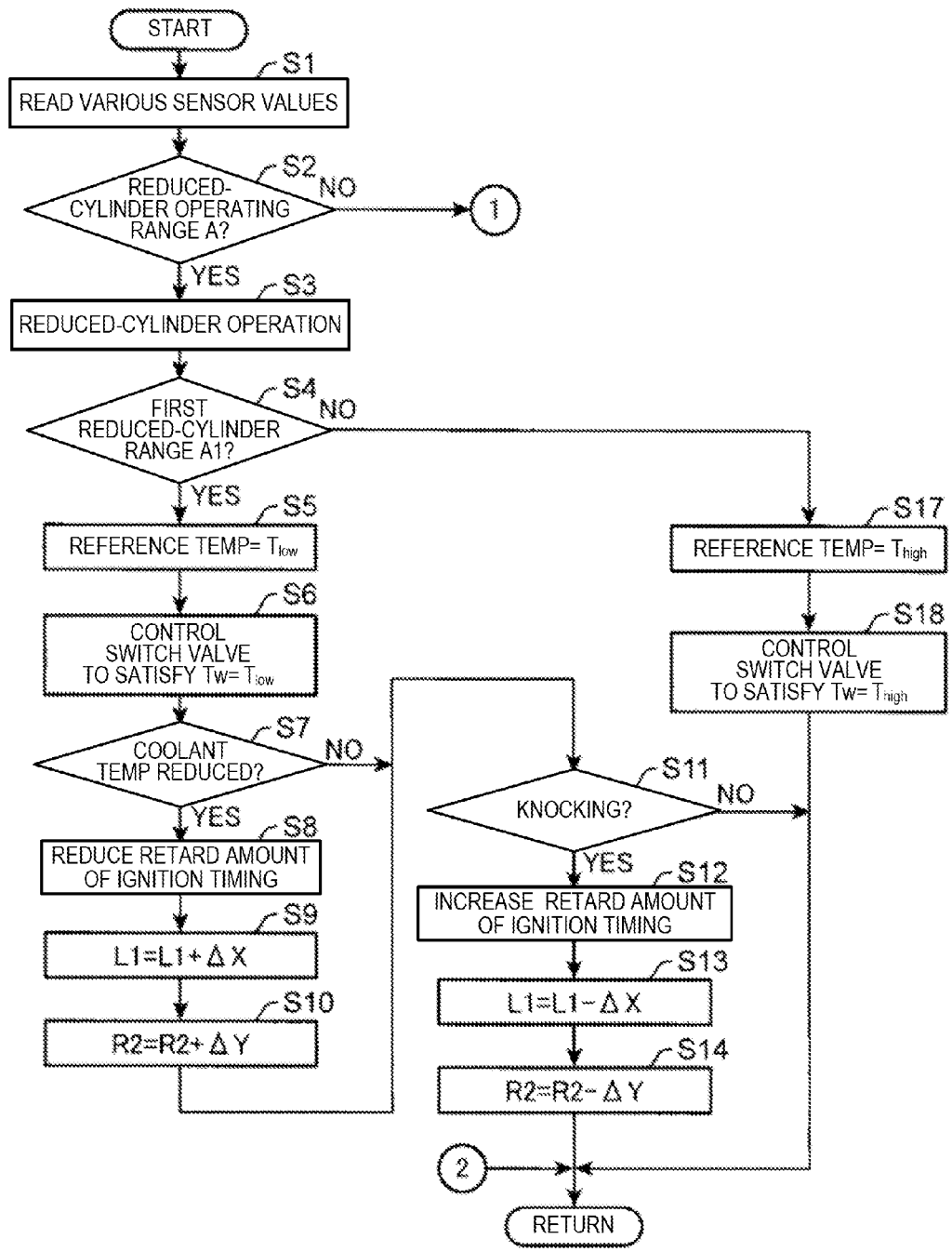
FIG. 5 is a first flowchart illustrating a flow of a control operation performed while the engine is in operation.
Figure 6:
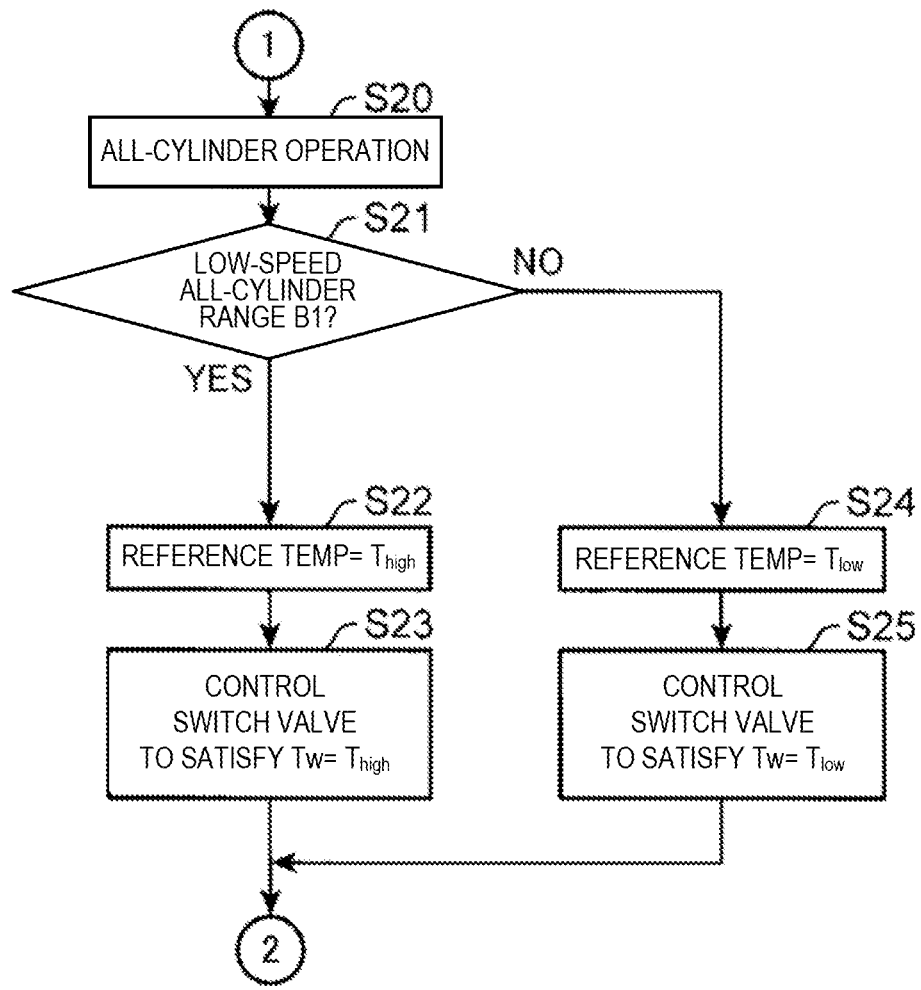
FIG. 6 is a second flowchart illustrating a flow of a control operation performed while the engine is in operation.

When the processing in FIG. 5 starts, the ECU 50 reads the various sensor values (S1). Specifically, the ECU 50 reads the respective detected signals from the engine speed sensor SN1, the vibration sensor SN2, the airflow sensor SN3, the coolant temperature sensor SN4, and the accelerator sensor SN5, so as to acquire various information including the engine speed, the vibration strength, the intake air amount, the coolant temperature, and the accelerator actuation degree.

Next, based on the information read at S1, the ECU 50 determines whether the engine is operated in the reduced-cylinder operating range A (S2). Specifically, the ECU 50 determines the engine load and the engine speed based on the information acquired from the engine speed sensor SN1, the airflow sensor SN3, and the accelerator sensor SN5. The ECU 50 then determines whether an operating state of the engine obtained based on the engine load value and the engine speed value corresponds to a position within the reduced-cylinder operating range A illustrated in FIG. 4.

When it is confirmed that the engine is operated in the reduced-cylinder operating range A (S2: YES), the ECU 50 performs the reduced-cylinder operation where the number of active cylinders is reduced (S3). Specifically, the ECU 50 controls the injectors 11, the ignition plugs 12, and the valve stopping mechanism parts 18a and 19a of the respective cylinders 2 so that two of the four cylinders 2 of the engine body 1 are deactivated (only the other two cylinders 2 are active). More specifically, the operations of the injectors 11 and the ignition plugs 12 of the cylinders to be deactivated are stopped and the lift operations of the intake valves 8 and the exhaust valves 9 of the deactivated cylinders are stopped by driving the valve stopping mechanism parts 18a and 19a. Thus, the fuel injection and the ignition are stopped in the deactivated cylinders, and the combustion cannot be performed. Note that, in the reduced-cylinder operation where two of the four cylinders 2 are deactivated, the combination of the deactivated cylinders 2 is selected such that the ignition order of the deactivated cylinders is not continuous. For example, either one of a combination of the first and fourth cylinders and a combination of the second and third cylinders is selected as the deactivated cylinders.

After the reduced-cylinder operation is started as described above, the ECU 50 determines whether the current operating state of the engine corresponds to a position within the first reduced-cylinder range A1 in which the engine load is relatively high within the reduced-cylinder operating range A (S4).

When the result of the determination at S4 is "NO," in other words, when it is confirmed that the engine is operated in the second reduced-cylinder range A2 on the lower load side and not in the first reduced-cylinder range A1 on a higher load side, the ECU 50 sets the reference temperature of the coolant, which is a temperature at which the switch valve 34 of the cooling mechanism 30 is opened (the temperature at which the coolant is allowed to flow into the radiator 33), to a predetermined normal reference temperature $T_{high}$ (S17). Note that the value of the normal reference temperature $T_{high}$ may be, for example, 88° C.

Sequentially, the ECU 50 controls the opening of the switch valve 34 so that the temperature of the coolant of the engine (hereinafter may be referred to as the coolant temperature, and is denoted by Tw) is kept to the normal reference temperature $T_{high}$ (S 18). This normal reference temperature $T_{high}$ is set at S17. Specifically, the ECU 50 controls the opening of the switch valve 34 such that the switch valve 34 is opened when the coolant temperature Tw is higher than the normal reference temperature $T_{high}$, and the switch valve 34 is closed when the coolant temperature Tw is lower than the normal reference temperature $T_{high}$. Thus, the coolant flows into the radiator 33 and is cooled only when the coolant temperature Tw is higher than the normal reference temperature $T_{high}$ and, therefore, the coolant temperature Tw is kept within a value range close to the normal reference temperature $T_{high}$ without significantly exceeding or falling below the normal reference temperature $T_{high}$.

Next, a control operation in the case where the engine is operated in the first reduced-cylinder range A1 within the high load part (higher than the load L2) of the reduced-cylinder operating range A (S4: YES) is described. In this case, the ECU 50 sets the reference temperature of the coolant (the temperature at which the switch valve 34 is opened) to a low reference temperature $T_{low}$ which is lower than the normal reference temperature $T_{high}$ (S5). Note that the value of the low reference temperature $T_{low}$ may be, for example, 78° C.

Sequentially, the ECU 50 controls the opening of the switch valve 34 so that the coolant temperature Tw of the engine is kept at the low reference temperature $T_{low}$ (S6). This low reference temperature $T_{low}$ is set at S5. Specifically, the ECU 50 controls the opening of the switch valve 34 such that the switch valve 34 is opened when the coolant temperature Tw is higher than the low reference temperature $T_{low}$, and the switch valve 34 is closed when the coolant temperature Tw is lower than the low reference temperature $T_{low}$.

Here, if the coolant temperature Tw is within the value range close to the normal reference temperature $T_{high}$ described above immediately before the determination at S6, the coolant temperature Tw is significantly higher than the low reference temperature $T_{low}$ (higher by approximately 10° C. if $T_{high}$=88° C. and $T_{low}$=78° C.). Therefore, at S6, the opening of the switch valve 34 is set sufficiently large, and a large amount of coolant is introduced into the radiator 33.

As described above, at S6, the opening of the switch valve 34 is set larger as a temperature difference between the actual coolant temperature Tw and the low reference temperature $T_{low}$ (Tw−$T_{low}$) increases, and the flow rate of the coolant flowing into the radiator 33 is increased, so that the coolant temperature Tw is lowered to be close to the low reference temperature $T_{low}$ more quickly by improving the cooling performance more as the temperature difference is increases.

After starting the control of the coolant temperature Tw described above, the ECU 50 determines whether the coolant temperature Tw has actually decreased, more specifically, whether a decrease in temperature obtained by subtracting the coolant temperature Tw after the processing at S6 from the coolant temperature Tw immediately before S6 is larger than a predetermined amount (S7).

When it is confirmed that the coolant temperature Tw has decreased by more than the predetermined amount (S7: YES), the ECU 50 reduces the retard amount of the ignition timing (S8). Specifically, in the first reduced-cylinder range A1 within the high load part of the reduced-cylinder operating range A, it is originally required to retard the ignition timing to avoid knocking (abnormal combustion caused by self-ignition of uncombusted end gas); however, in this embodiment, since the coolant temperature Tw of the engine is lowered toward the low reference temperature $T_{low}$ at S6, the environment where knocking easily occurs is improved. Therefore, knocking can be avoided even if the retard amount of the ignition timing is reduced, and the control at S10 for reducing the retard amount can be performed. Note that the retard amount herein is set according to the decrease in coolant temperature Tw obtained at S7, and the retard amount is increased even more as the magnitude of the decrease in coolant temperature Tw increases.

Figure 7:
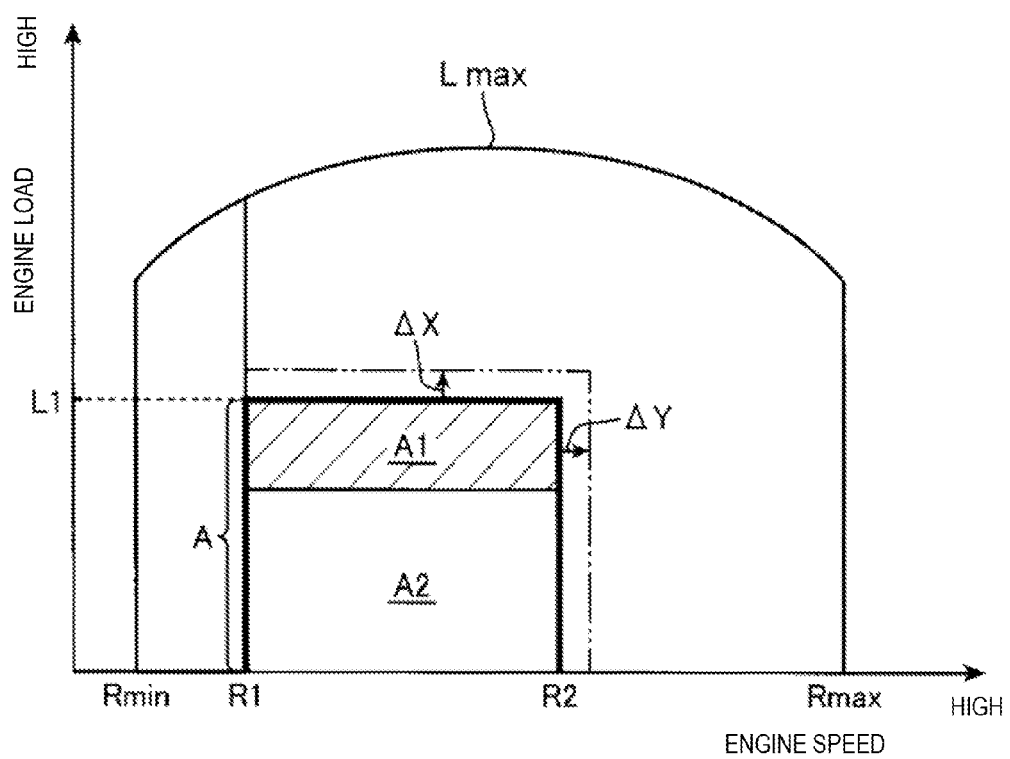
FIG. 7 is a chart illustrating how a reduced-cylinder operating range is expanded according to a temperature of a coolant of the engine.

Sequentially, the ECU 50 increases the reference load L1, which is the upper limit load in the reduced-cylinder operating range A, by ΔX (S9). Thereby, the reduced-cylinder operating range A is expanded at a higher load side by the increase amount ΔX as described in FIG. 7. The increase amount ΔX of the engine load is set according to the decrease in coolant temperature Tw obtained at S7, and the increase amount ΔX is increased more as the magnitude of the decrease in coolant temperature increases.

Sequentially, the ECU 50 increases the second reference speed R2, which is the upper limit speed in the reduced-cylinder operating range A, by ΔY (S10). Thereby, the reduced-cylinder operating range A is expanded at a higher speed side by the increase amount ΔY as described in FIG. 7. The increase amount ΔY of the engine speed is set according to the decrease in coolant temperature Tw obtained at S7, and the increase amount ΔY is increased more as the magnitude of the decrease in coolant temperature increases.

After the ignition retard amount is reduced and the reduced-cylinder operating range A is expanded as described above, the ECU 50 determines if knocking has occurred in the engine body 1 based on the detection value of the vibration sensor SN2 (the vibration strength of the engine body 1) (S11). Specifically, when abnormal combustion (i.e., knocking) occurs, comparatively large vibration is generated in the engine body 1 due to a steep combustion pressure and the like. Therefore, at S11, when the vibration strength (acceleration) of the engine body 1 is higher than a predetermined threshold, knocking is determined to have occurred.

When the occurrence of knocking is confirmed (S11: YES), the ECU 50 increases the retard amount of the ignition timing to avoid knocking thereafter (S12). Moreover, the reference load L1, which is the upper limit load in the reduced-cylinder operating range A, is reduced by ΔX (S13) and the second reference speed R2, which is the upper limit speed in the reduced-cylinder operating range A, is reduced by ΔY (S14). Thus, the reduced-cylinder operating range A is narrowed in the engine load axis and the engine speed axis contrary to S9 and S10 described above.

Next, a control operation in a case where the engine is operated in a range other than the reduced-cylinder operating range A (any of the low-speed, high-speed and high-load all-cylinder ranges B1, B2 and B3) (S2: NO) is described with reference to FIG. 6. In this case, the ECU 50 performs the all-cylinder operation where all of the four cylinders 2 are active (S20). Specifically, the ECU 50 controls the injectors 11 and the ignition plugs 12 so that the fuel injection and the spark-ignition are performed in all the cylinders 2 of the engine body 1, and controls the valve stopping mechanism parts 18a and 19a not to be operated so that the intake and exhaust valves 8 and 9 of all the cylinders 2 are driven.

Sequentially, the ECU 50 determines whether the current operating state of the engine specified based on the information acquired at 51 corresponds to a position within the low-speed all-cylinder range B1 (S21).

When it is confirmed that the engine is operated in the low-speed all-cylinder range B1 (S21: YES), the ECU 50 sets the reference temperature of the coolant (the temperature at which the switch valve 34 is opened) to the normal reference temperature $T_{high}$ (e.g., 88° C.) (S22) and controls the opening of the switch valve 34 so that the coolant temperature Tw of the engine is kept at the normal reference temperature $T_{high}$ (S23).

On the other hand, when it is confirmed that the engine is operated in either one of the high-speed all-cylinder range B2 and the high-load all-cylinder range B3 (S21: NO), the ECU 50 sets the reference temperature of the coolant to the low reference temperature $T_{low}$ (e.g., 78° C.) which is lower than the normal reference temperature $T_{high}$ (S24), and controls the opening of the switch valve 34 so that the coolant temperature Tw of the engine is kept at the low reference temperature $T_{low}$ (S25).

(4) Operation

As described above, the engine of this embodiment includes the engine body 1 having the plurality of (four) cylinders 2, the cooling mechanism 30 for cooling the engine body 1 by using the coolant, and the ECU 50 (controller) for controlling the respective components of the engine including the cooling mechanism 30. The ECU 50 performs the reduced-cylinder operation where the number of active cylinders is reduced in the reduced-cylinder operating range A set within the partial load range of the engine, and the ECU 50 expands the reduced-cylinder operating A more at the higher engine load and speed sides as the coolant temperature Tw becomes lower (S9 and S10 in FIG. 5). Such a configuration has an advantage that the opportunity to perform the reduced-cylinder operation with excellent fuel consumption performance can be increased as much as possible and the fuel consumption performance can effectively be improved.

Specifically, in this embodiment, since the reduced-cylinder operating range A where the number of active cylinders 2 is reduced is expanded more at the higher load and speed sides as the temperature Tw of the coolant for cooling the engine body 1 becomes lower, the opportunity to perform the reduced-cylinder operation is increased more as the coolant temperature Tw becomes lower, and the fuel consumption performance of the engine improves. On the other hand, when the coolant temperature Tw is high, compared to when it is low, since the reduced-cylinder operating range A is narrowed at the engine load axis and the engine speed axis, unlike when the reduced-cylinder operating range A is expanded regardless of the coolant temperature Tw, it becomes unnecessary to significantly retard the ignition timing as an abnormal combustion countermeasure, and degradation of the fuel consumption due to the retarding can be avoided.

For example, if the reduced-cylinder operating range A is expanded at the engine load axis and the engine speed axis despite the coolant temperature Tw being high, the temperature of the active cylinder is increased at a high engine load and a high engine speed, and knocking (abnormal combustion caused by a self-ignition of uncombusted end gas) may occur. Although this situation can be avoided by significantly retarding the ignition timing, in this case, the fuel consumption degrades compared to the all-cylinder operation (the engine operation where all four of the cylinders 2 are active) in the same operating range.

On the other hand, when the reduced-cylinder operating range A is only expanded under a condition where the coolant temperature Tw of the engine is low (i.e., knocking is hard to occur) as this embodiment, the above situation can be avoided and it can be possible to only perform the reduced-cylinder operation with excellent fuel consumption performance, and also the opportunity to perform the reduced-cylinder operation can be increased according to the cooled state of the engine.

Figure 8:
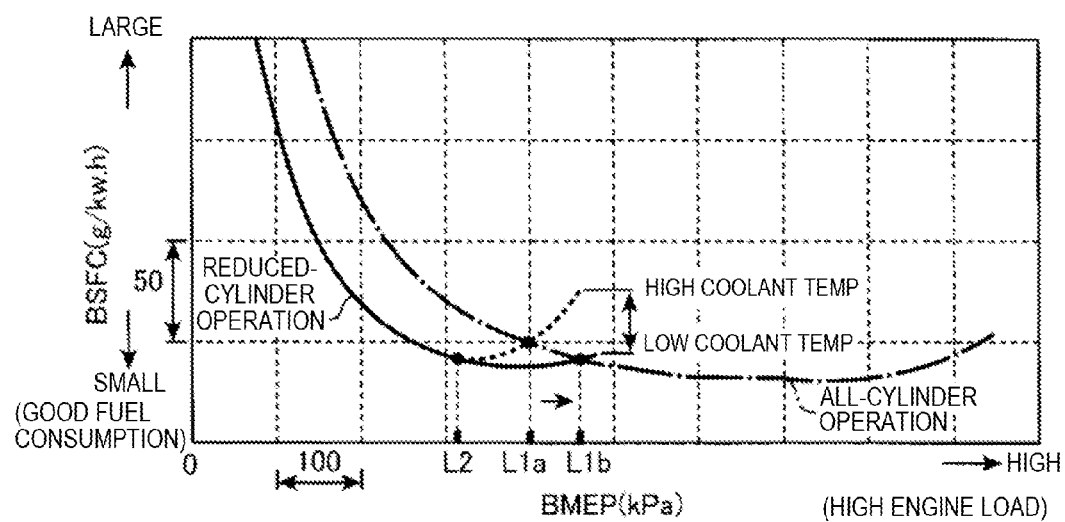
FIG. 8 is a chart illustrating fuel consumption performance of the engine.

FIG. 8 is a chart illustrating a relationship between a brake specific fuel consumption (BSFC) and a brake mean effective pressure (BMEP) when the engine is operated under a condition where the rotational speed is fixed, in which the value in the reduced-cylinder operation is indicated by the solid wave line and the value in the all-cylinder operation where all of the four cylinders are active is indicated by the dashed wave line. Note that the BSFC of the vertical axis indicates that the fuel consumption is less as the value is lower, and the BMEP in the horizontal axis indicates that the engine load is higher as the value is higher.

As it is clear from the chart in FIG. 8, when the reduced-cylinder operation is performed in the partial load range of the engine, the fuel consumption improves better than in the all-cylinder operation. Note that when the engine load becomes high, the fuel consumption in the reduced-cylinder operation will no longer improve but degrades worse than when the all-cylinder operation is performed under the same condition due to the ignition timing being retarded to avoid knocking. Specifically, when the ignition timing is retarded, since it is required to increase the amount of fuel injected to enrich an air-fuel ratio in order to obtain the same amount of torque (or suppress the temperature increase of the exhaust gas), the fuel consumption degrades.

Note that the required retard amount of the ignition timing is different according to the temperature state of the engine body 1. For describing the difference, in the chart of FIG. 8, the fuel consumptions at different coolant temperatures Tw on a higher engine load side of the load L2 (the boundary load between the first and second reduced-cylinder ranges A1 and A2 in the map of FIG. 4) are respectively indicated by the solid line and the broken line. Specifically, the broken wave line indicates the fuel consumption when the coolant temperature Tw is at the normal reference temperature $T_{high}$, which is the same as the lower load side of the load L2 (the second reduced-cylinder range A2), and the solid wave line indicates the fuel consumption when the coolant temperature Tw is at the low reference temperature $T_{low}$ ($<T_{high}$).

As it can be understood from comparing the solid wave line with the broken wave line, the fuel consumption when the reduced-cylinder operation is performed on the higher load side of the load L2 is improved more when the coolant temperature Tw is low (Tw=$T_{low}$) than when the coolant temperature Tw is high (Tw=$T_{high}$). This is because when the coolant temperature Tw is low, the temperature of the active cylinder is reduced and knocking does not occur easily, and it is not required to significantly retard the ignition timing to avoid knocking. Thus, the retard amount of the ignition timing is reduced and the fuel consumption is improved.

As described above, the reduced retard amount of the ignition timing due to the decrease of the coolant temperature Tw means that the range where the low-fuel-consuming reduced-cylinder operation can be performed is expanded to a higher engine load as the coolant temperature Tw becomes lower. Specifically, in FIG. 8, the fuel consumption in the reduced-cylinder operation when the coolant temperature Tw is high (broken line) is the same as the fuel consumption in the all-cylinder operation at a load L1a higher than the load L2, whereas the fuel consumption in the reduced-cylinder operation when the coolant temperature Tw is low (solid line) is the same as the fuel consumption in the all-cylinder operation at a load L1a higher than the load L1a. As described above, since the upper limit value of the engine load range where the effect of fuel consumption improvement can be obtained by performing the reduced-cylinder operation is higher when the coolant temperature is low than when the coolant temperature is high (L1b>L1a), it can be understood that the low-fuel-consuming reduced-cylinder operation can be continued to a higher engine load when the coolant temperature is low.

For the above reasons, in this embodiment, the range where the reduced-cylinder operation is performed (in other words, the reduced-cylinder operating range A) is expanded to a higher engine load as the coolant temperature Tw becomes lower (S9). Moreover, since the knocking countermeasure is needed similarly on the higher engine speed side of the reduced-cylinder operating range A, in this embodiment, the reduced-cylinder operating range A is expanded to a higher engine speed as the coolant temperature Tw becomes lower (S10). Thereby, in this embodiment, the opportunity to perform the reduced-cylinder operation with excellent fuel consumption performance increases and the fuel consumption performance of the engine improves more.

Moreover, in this embodiment, when the occurrence of knocking is confirmed during the operation in the reduced-cylinder operating range A, the reduced-cylinder operating range A is not expanded but narrowed (S13 and S14). When the reduced-cylinder operating range A is narrowed due to knocking actually occurring, the situation where knocking occurs afterward can surely be avoided without unnecessarily expanding the reduced-cylinder operating range A.

Moreover, in this embodiment, when the engine is operated in the first reduced-cylinder range A1 set within the high load part of the reduced-cylinder operating range A, compared to the second reduced-cylinder range A2 in the low load part (lower than the load L2) of the reduced-cylinder operating range A, the reference temperature of the coolant, in other words, the temperature at which the flow of the coolant into the radiator 33 is allowed, is lowered and, thus, the actual coolant temperature Tw is lowered. According to this configuration, the coolant temperature Tw is forcibly lowered and the environment where knocking is hard to occur is created during the engine operation in the first reduced-cylinder range A1 where knocking particularly easily occurs within the reduced-cylinder operating range A. Thus, the reduced-cylinder operating range A can surely be expanded to increase the opportunity of the reduced-cylinder operation, and thus, the fuel consumption performance of the engine can be improved more effectively.

Particularly, in the engine of this embodiment, since the geometric compression ratio of each cylinder 2 is set to 12:1 or higher which is slightly high for a gasoline engine, knocking naturally easily occurs. Therefore, performing the control of the coolant temperature Tw as described above means a great deal and, in combination with an improvement of a thermal efficiency due to the high compression ratio, more excellent fuel consumption can be obtained.

Moreover, in this embodiment, the reduced-cylinder operating range A is set in the range where the engine speed is lower than the second predetermined reference speed R2 and the engine load is lower than the predetermined reference load L1. The high-speed all-cylinder range B2 and the high-load all-cylinder range B3 where the all-cylinder operation is performed are set on the lower speed side of the second reference speed R2 and the higher load side of the reference load L1, respectively. Further, in the high-speed all-cylinder range B2 and the high-load all-cylinder range B3, similarly to the first reduced-cylinder range A1 described above, the coolant temperature Tw is set to the lower value ($T_{low}$) (S24 and S25 in FIG. 6). When the coolant temperature Tw is lowered in the all-cylinder operating ranges respectively set on the higher speed side and the higher load side of the reduced-cylinder operating range A (the high-speed all-cylinder range B2 and the high-load all-cylinder range B3), the occurrence of knocking can surely be prevented in a part of the range B2 where the engine load is particularly high therein and a part of the range B3 where the engine speed is particularly high therein (i.e., the parts where knocking easily occurs).

Here, although it can also be considered to lower the coolant temperature Tw only in the respective parts of the high-speed all-cylinder range B2 and the high-load all-cylinder range B3 where knocking easily occurs, in this case, for example, when the operating state of the engine is shifted from the first reduced-cylinder range A1 to either one of the high-speed all-cylinder range B2 and the high-load all-cylinder range B3, it becomes necessary to often change the coolant temperature Tw (e.g., change the coolant temperature Tw to low, to high, and then to high again). This not only complicates the control, but a problem also occurs with respect to responsiveness. Considering such a problem, in this embodiment, the coolant temperature Tw is lowered throughout the high-speed all-cylinder range B2 and the high-load all-cylinder range B3. Thus, the occurrence of knocking can surely be prevented while avoiding the problem described above.

Moreover, in this embodiment, the reduced-cylinder operating range A is set to the range where the engine speed is higher than the predetermined first reference speed R1, and the low-speed all-cylinder range B1 where the all-cylinder operation is performed is set on the lower engine speed side of the first reference speed R1. Further, in the low-speed all-cylinder range B1, compared to the first reduced-cylinder range A1 described above, the coolant temperature Tw is set to the higher value ($T_{high}$) (S22 and S23 in FIG. 6). According to this configuration, under a condition where the flowability of the gas mixture inside the combustion chamber 10 easily becomes poor because the engine speed is low, the engine body 1 is not cooled unnecessarily, and the increase in generated amount of HC can be prevented.

Note that, in this embodiment, the reference temperature at which the switch valve 34 of the cooling mechanism 30 (the flow of the coolant into the radiator 33 is allowed) is lowered to lower the actual coolant temperature Tw; however, the coolant temperature Tw may also be lowered by other methods which are not dependent on the change in reference temperature as described above. For example, when the radiator 33 is disposed rearward of the front grille, the coolant temperature Tw can be controlled by providing a grille shutter for changing an opening in the air port formed in the front grille, and opening or closing the grille shutter to change the flow rate of travel air blown to the radiator 33. Alternatively, the coolant temperature Tw can be controlled by providing an electric pump driven by an electric motor as the coolant temperature 31, and adjusting the speed of the electric motor to change the flow rate of the coolant.

Moreover, in this embodiment, the control of lowering the coolant temperature Tw is performed in the first reduced-cylinder range A1 where the engine load is high within the reduced-cylinder operating range A, the high-speed all-cylinder range B2 located on the higher speed side of the reduced-cylinder operating range A, and the high-load all-cylinder range B3 located on the higher load side of the reduced-cylinder operating range A; however, such a control of lowering the coolant temperature Tw may be prohibited when a gear range of a transmission is low.

The transmission herein indicates a component for decelerating the rotation of the crankshaft 15 (output shaft) of the engine body 1 while transmitting the rotation to wheels of the vehicle, and is provided with a plurality of gear ranges (e.g., six forward ranges and one reverse range). When the gear range of the transmission is lower than a predetermined range number, (e.g., with the transmission with six forward ranges, when the gear range is in the third range or lower), the operating state of the engine shifts frequently and may be shifted up (the gear range may be changed to a high gear range) soon. Therefore, even if the coolant temperature Tw is lowered when the gear range is low, when the temperature of each cylinder 2 of the engine body 1 is actually lowered, the operating state may have already been shifted to correspond to a position in the operating range where the lowering of the coolant temperature Tw is not required (e.g., either one of the second reduced-cylinder range A2 and the low-speed all-cylinder range B1). On the other hand, in the case where the control of lowering the coolant temperature Tw is only allowed when the gear range of the transmission is high, (i.e., when the shift of the operating state is gentle and close to a cruise state), the temperature of the engine body 1 is considered to be able to be sufficiently lowered before the operating state of the engine shifts to correspond to a position in the operating range where the lowering of the coolant temperature Tw is not required (e.g., either one of the second reduced-cylinder range A2 and the low-speed all-cylinder range B1), even if some extent of a delay period of time exists until the temperature of the engine body 1 actually decreases. Therefore, the control of lowering the coolant temperature Tw will not be a waste.

Moreover, in this embodiment, the geometric compression ratio of the engine body 1 is set to 12:1 or higher; however, when gasoline with high octane number RON (Research Octane Number) is used as the fuel, since abnormal combustion (e.g., knocking) is relatively unlikely to occur, the geometric compression ratio may be set higher. Specifically, when gasoline with an octane number of 95 or more is used as the fuel, the geometric compression ratio may be 13:1 or higher. On the other hand, when the octane number is 91 or higher but lower than 95, the geometric compression ratio is still preferable to be 12:1 or higher.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine Body
2 Cylinder
30 Cooling Mechanism
50 ECU (Controller)
A Reduced-cylinder Operating Range
A1 First Reduced-cylinder Range
A2 Second Reduced-cylinder Range
B2 High-speed all-cylinder Range
B3 High-load all-cylinder Range

What is claimed is:

1. A variable cylinder engine, comprising:
an engine body having a plurality of cylinders;
a cooling mechanism for cooling the engine body by using a coolant which flows through the engine body, wherein the cooling mechanism includes a coolant path and a radiator;
a switch valve able to regulate a flow of the coolant through the coolant path;
a coolant temperature sensor which detects a coolant temperature;
a valve stopping mechanism configured to selectively reduce cylinder operation of the engine to a reduced number of cylinders when an operating point of the engine is in a reduced-cylinder operating range; and
a controller configured to:
calculate a first operating point that defines where the engine can reduce cylinder operation via the valve stopping mechanism when below and increase cylinder operation via the valve stopping mechanism when above, but when the temperature of the coolant detected by the temperature sensor decreases further during reduced cylinder operation recalculate to create a second operating point to be a higher value than the first operating point so that reduced cylinder operation continues when above the first operation point but below the second operating point.

2. The variable cylinder engine of claim 1, wherein the first operating point is a reference load of the engine.

3. The variable cylinder engine of claim 1, wherein the second operating point is another reference load of the engine that is higher than the reference load of the first operating point.

4. The engine of claim 1, wherein the controller narrows the reduced-cylinder operating range, when occurrence of abnormal combustion is confirmed while the engine is operated in the reduced-cylinder operating range.

5. The engine of claim 1, wherein when the engine is operated in a range on either one of a higher engine load side and a higher engine speed side of the reduced-cylinder operating range, the controller activates all of the cylinders and, lowers the coolant temperature.

* * * * *